United States Patent Office 2,742,353
Patented Apr. 17, 1956

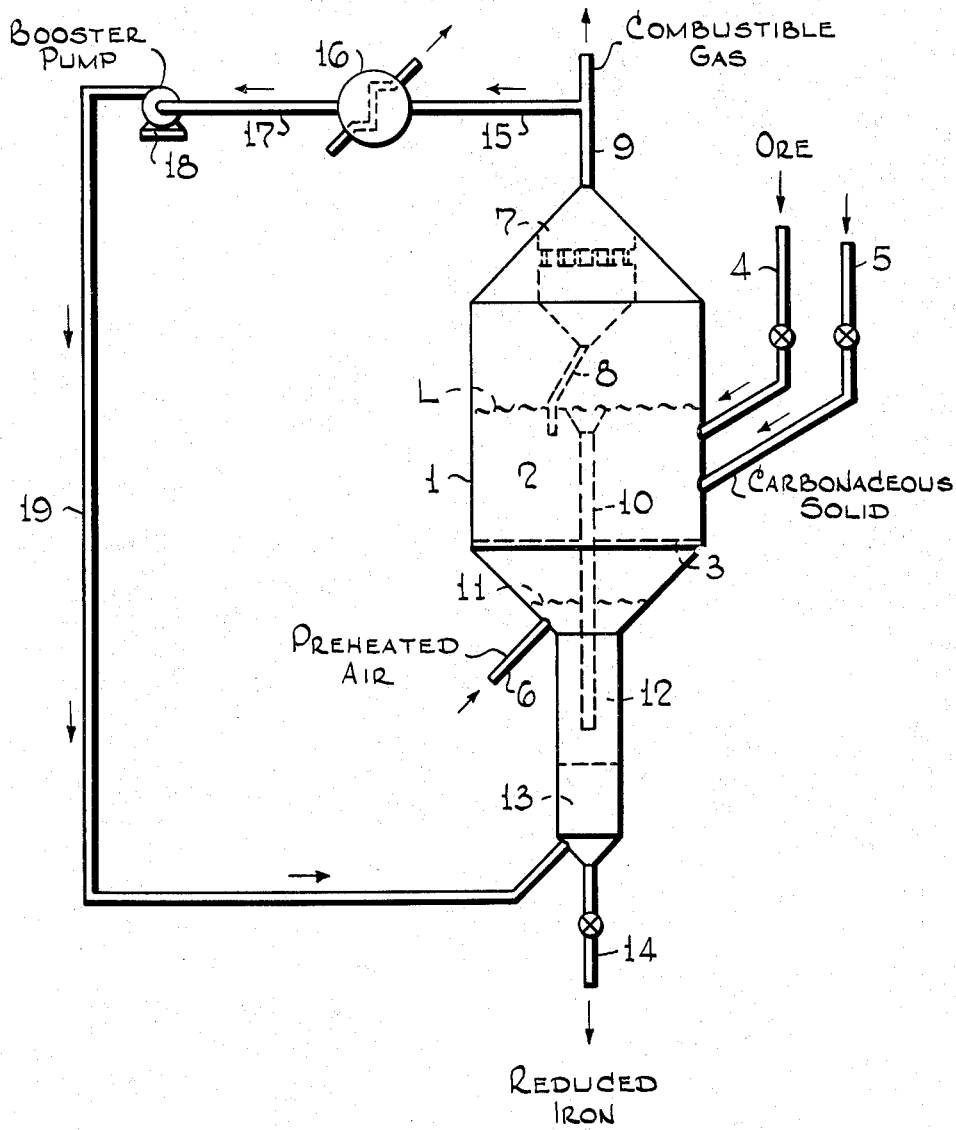

2,742,353

IRON ORE REDUCTION PROCESS

Henry J. Ogorzaly, Summit, N. J., assignor to Esso Research and Engineering Company, a corporation of Delaware Application November 1, 1954, Serial No. 465,959

6 Claims. (Cl. 75—26)

This invention relates to a process for reducing ores of the iron ore type to metal by contacting the ore with solid carbonaceous material which is burned by air or other combustion supporting gas to produce a reducing gas and the required heat for the reduction. The invention is specifically applicable to the production of sponge iron from iron ore.

This application is a continuation-in-part of Serial No. 290,145, filed May 27, 1952 and now abandoned.

The invention will be more fully understood by reference to the accompanying drawing which is a semi-diagrammatic view in sectional elevation of one type of apparatus suitable for carrying out the invention.

Referring to the drawing, the figure represents a vessel comprising an upper reduction section A, a middle gasification section B, and a lower separation section C. The vessel contains a bed 2 in section A of fluidized, finely-divided iron ore and carbonaceous material. The separation zone C contains an upper layer of carbon 12 and a lower layer of separated sponge iron 13. Provision is made for: conduit 4 for the introduction of finely-divided ore; conduit 5 for the introduction of a finely-divided carbonaceous solid; conduit 6 for the introduction of preheated air or other combustion-supporting gas; line 14 for the removal of reduced iron; cyclone system 7 with dipleg 8 for the return of recovered fines for gases leaving the reduction zone; pipe 9 for the removal of low grade combustible gas from the reduction zone; and overflow line and standpipe 10 for removing solids from the reduction zone and transferring them to the separating zone.

Ores suitable for treatment according to the present invention include oxidic iron ores such as hematite, magnetite, limonite, siderite and laterite. As is well known, these iron ores are found in sedimentary and metamorphic rocks, usually associated with other mineral constituents such as quartz and clays. To be useful for purposes of the invention it is desirable that the iron ore contain at least about 40% Fe, preferably above 50% Fe.

Before charging to the process the ore is ground or pulverized to a size of about 20 to 500 microns. The optimum particle size will depend somewhat on the density of the ore and the upward velocity of the fluidizing gas in the reactor, which velocity may range from about 0.5 to 5 feet per second, or preferably about 1.5 to 3 feet per second. With the preferred gas velocities just stated the average particle size of the ore may advantageously be in the range of about 20 to 150 microns. The preferred fluidizing gas is air and the oxides of carbon produced in the process. However, instead of air other combustion supporting gases such as oxygen-enriched air, pure oxygen or mixtures of oxygen and steam can be used similarly. The combustion supporting gas is fed to the process in a ratio equivalent to about 15 to 30 standard cubic feet of oxygen per pound of carbon.

The iron ore is reduced in the process with the aid of a solid carbonaceous reducing agent such as finely divided coal, coke, petroleum coke, charcoal, peat, lignite or the like. This reducing agent is added to the reaction zone in a ratio equivalent to about 0.3 to 0.75 part of carbon per part of ore. The factor which primarily determines the carbon requirement is the quantity of heat which must be supplied while maintaining a gas of sufficiently strong reducing power as indicated by the CO content of the discharged gas. Before charging to the reactor, the carbonaceous reducing agent is comminuted to approximately the same size as the iron ore, or at least to pass through a 20-mesh screen.

The operation of the process will now be described with reference to the reduction of an iron ore having the following analysis: 78.6% $Fe_2O_3$, 7.3% $SiO_2$ and 14.1% $H_2O$. The ore and coke, both ground to a particle size of about 20 to 150 microns, are charged via lines 4 and 5 to the reduction zone A of vessel 1 where the solids are maintained in the form of a dense, turbulent, fluidized mass 2 having an upper level L at the level of the weir of overflow line 10. The feed ratio of coke to ore is about 0.5:1. The solids are maintained in the fluidized condition within the reduction zone by the introduction to said zone through distributing grid 3 of a gas at a superficial velocity of about 2.5 feet per second. At this velocity the turbulence within the bed in the reduction zone is such that the iron ore and carbonaceous solid in intimate mixture are dispersed throughout the bed and any separation of the two solids, if any is in fact encountered, is extremely minor. The depth of the reducing bed between grid 3 and level L is desirably between about 10 and 30 feet, e. g. 20 feet, so as to aid in keeping a relatively high concentration of carbon monoxide in the ore reduction zone. Air in an amount equal to about 15 standard cubic feet of oxygen per pound of carbon feed is introduced into the bottom portion of gasification zone B via line 6, that is, into the dense carbon phase 12 which extends into the gasification zone from separation zone C as described hereafter. The air introduced via line 6 is preferably preheated to a convenient temperature such as 500° F. This air burns a portion of the carbonaceous solid in the gasification zone with complete consumption of the oxygen content of the gas and the prduction principally of $CO_2$ with some CO. This combustion gas also entrains some carbon from the dense carbon phase through level 11 back into the reduction zone. In the reduction zone, a substantial part of the $CO_2$ is reduced to CO by the large excess of hot carbon in the bed.

The iron oxide which is also suspended in the reducing bed is converted to substantially oxygen-free metal by the carbon monoxide content of the gas. In order to produce a gas having a relatively low ratio of $CO_2$ to CO in reduction zone A it is necessary to operate at a temperature in the range of between approximately 1500° F. and 2500° F., e. g. at 1800° F. The optimum temperature level depends on the reactivity of the carbonaceous material supplied and the fusion point of any ash which may be present. With carbons of high reactivity, for example, the lignitic and sub-bituminous coals, charcoal of vegetable origin, etc., the lower range of temperatures is satisfactory to produce a reducing gas of high CO and low $CO_2$ content. However, the production of a high CO content gas is favored by higher reduction temperatures as well as by deep beds of solids, so that, in general, it is preferred to operate at as high a temperature within the above range as is consistent with avoiding of plugging of the bed and of clinker formation due to plasticity developing in the reduced iron, or in the ash content of the carbonaceous material charged to the reduction zone. In this regard it should be noted that the presence of a relatively large excess of carbonaceous material is very effective in increasing the temperature level at which the reduced iron can be maintained without experiencing stickiness and balling of the iron particles.

This process may be operated over a range of pressures from substantially atmospheric pressure, which is preferred, to 10 or even 20 atmospheres. The upper limit is not critical. Higher pressures have the advantage of giving increased reaction rate for the reduction of the ore but this advantage is usually outweighed by the unfavorable effect of pressure on the $CO_2/CO$ ratio in the direction of increased $CO_2$ production. The higher pressures also require additional compression of the air employed.

The reduced iron ore particles in admixture with an excess of solid carbon overflow the level of the weir attached to standpipe 10 and flow through the standpipe into the lower separating zone C to which gas of a reducing or non-oxidizing nature, e. g. a portion of the reduction zone off-gas which is rich in carbon monoxide, or an extraneous gas such as nitrogen, is supplied at a low rate through line 19. The superficial gas velocity in this zone is kept low, e. g. at about 0.02 to 0.50 feet/second, or preferably about 0.10 feet/second as measured across the total cross-sectional area of the separating zone. This causes the solids to remain aerated and mobile, but avoids turbulent motion. As a result the light carbonaceous matter is easily separated as an upper, dense phrase layer 12 from the heavy reduced iron which forms a lower, dense phrase layer 13. The layer of iron is removed from the system via pipe 14 which is advantageously equipped with a water-cooled slide valve. The supernatant carbonaceous phase forms an upper level 11 at the bottom of section B, the gasification zone. Separation of the solids is easily effected by the greater buoyancy of the lighter carbon relative to the heavy metal. The height of the dense carbon layer 12 in the separation and gasification zones is controlled by the incoming air which gasifies the carbon and entrains some of it directly as suspended solid into the reduction bed.

The reduced iron particles withdrawn via line 14 will usually contain a substantial amount of gangue, e. g. between about 10 and 20 per cent. This gangue can be subsequently separated from the reduced iron in any convenient manner, notably by the process described in Patent 2,540,593. Furthermore, some gangue particles essentially free of iron may also be formed in the process. Since such gangue particles will be lighter than the reduced metal, there may be some tendency for elutriation from the reduced iron bed 13 into the coke layer 12. Any tendency toward excessive accumulation of gangue in the system may be prevented in such a case by withdrawing a purge stream of solids, preferably from layer 12. This purge stream may be either discarded in its entirety or further separated by another elutriation into gangue for discard and coke for recycle to the system.

The reducing gases pass up through bed 2 of the reduction zone and enter cyclone system 7 wherein entrained solid particles are removed and returned to the bed via dip-leg 8. Gases are removed from the cyclone and separated from the system via line 9.

Control of the system is maintained by charging finely divided ore continuously at a rate such that satisfactory reduction is obtained, e. g. allowing an ore residence time in the reduction bed of about 10 to 60 minutes, and withdrawing reduced metal from the bottom of the separating zone at such a rate as to maintain the depth of the metal layer 13 within the separating zone constant. Carbonaceous solid is added in the ratios specified before so as to maintain a suitable carbon content within the reduction bed.

As already mentioned, in many cases it is advantageous to supply the small amount of gas required for separating carbon from the reduced metal by withdrawing part of the overhead gas from the reduction zone. In such a case the gas may be withdrawn via line 15, cooled in cooler 16 and passed via pipe 17 to booster pump 18. The gas is recycled via line 19 to the separating zone where it enters at a bottom portion thereof. This gas is reducing in nature and may be effectively used to eliminate the small proportion of residual oxygen associated with incompletely reduced ore overflowing from zone A. By its cooling action it also tends to reduce any sticking difficulties due to slight plasticity of the finely divided reduced metal. The overhead gas from the reduction zone corresponds in nature to blast furnace gas and is similarly useful for combustion service where a low grade fuel gas is satisfactory.

In reading the foregoing description it should be understood that all ratios and percentages of materials are expressed throughout on a weight basis unless otherwise indicated.

Having described the general nature and specific embodiments of the invention, it will also be understood that its scope is not limited thereto except as particularly pointed out in the appended claims.

What is claimed is:

1. A process for reducing oxidic ore of the iron ore type which comprises introducing a finely divided ore and an excess of finely divided carbonaceous material into a reduction zone, introducing a gas comprising a mixture of $CO_2$ and CO into the reduction zone at a sufficiently high velocity in the range of about 0.5 to 5 feet per second to fluidize and maintain in turbulent suspension the finely divided solids in the reduction zone, removing a mixture of resulting reduced metal and carbon from the reduction zone to a separating zone, introducing a non-oxidizing gas at low velocity in the range of about 0.02 to 0.5 feet per second into a bottom portion of the separating zone and passing it upwardly through said mixture, thereby causing the separation of said mixture into a fluidized non-turbulent upper layer of carbon and a fluidized non-turbulent lower layer of metal, burning a substantial portion of the separated carbonaceous material with a combustion supporting gas at a temperature in the range of 1500° to 2500° F. to form the said gas mixture comprising $CO_2$ and CO for passage to said reduction zone where a substantial proportion of the said $CO_2$ is converted to CO while simultaneously the said ore is reduced therein to the metallic state, and removing reduced metal from the lower portion of the separating zone.

2. A process according to claim 1 in which the ore has an iron content of at least 40% and in which the combustion supporting gas is air which is introduced into the system at a rate equal to about 15 to 30 standard cubic feet of oxygen per pound of carbon feed.

3. A process according to claim 2 in which the separated carbon layer is subadjacent to said reduction zone so that the air introduced into the carbon layer gasifies and partially entrains the carbon in the resulting combustion gases upwardly into the reduction zone.

4. A process according to claim 1 in which gaseous velocities in the reduction zone are maintained in the range of 1.5 to 3 feet per second, and in the separating zone at a velocity of about 0.1 feet per second.

5. A process according to claim 1 in which the mixture of metal and carbon is transferred from the reduction zone to the separating zone via an overflow conduit, said separating zone being immediately below the reduction zone.

6. A process according to claim 1 in which the carbonaceous material introduced into the reduction zone is petroleum coke and is fed in a weight ratio of about 0.3 to 0.75 part per part of ore feed.

No references cited.